United States Patent [19]

DeWalk

[11] 4,448,438
[45] May 15, 1984

[54] BOAT TRAILER WITH IMPROVED AFT SUPPORT CRADLE

[75] Inventor: Arnold R. DeWalk, Hubbard, Ohio

[73] Assignee: The Tee Nee Trailer Company, Youngstown, Ohio

[21] Appl. No.: 304,719

[22] Filed: Sep. 23, 1981

[51] Int. Cl.³ .............................................. B60P 3/10
[52] U.S. Cl. .................................. 280/414.1; 414/534
[58] Field of Search ...................... 280/414.1, 47.13 B; 414/534

[56] References Cited

U.S. PATENT DOCUMENTS 3,812,986  5/1974  Rogers ............................. 280/414.1
3,917,087  11/1975  Godbersen ....................... 280/414.1
3,974,924  6/1976  Ullman, Jr. ........................... 414/534

OTHER PUBLICATIONS

E Z Loader Boat Trailer advertising catalog, 1971.
E Z Loader Boat Trailer advertising catalog, 1972.
E Z Loader Boat Trailer advertising catalog, 1974.
Midwest Industries, Inc. advertising catalog for Shore-Land'r Boat Trailer.
Midwest Industries, Inc. advertising catalog for Shore-Land'r Boat Trailers.
Moody Manufacturing, Inc. advertising catalog for Moody Boat Trailers.
Shoreline, Inc. advertising catalog for Highlander Boat Trailers.
Shoreline, Inc. advertising catalog for E-Z Roller Boat Trailers, 1976.
Shoreline, Inc. advertising catalog for Straight Frame and "V" Frame Boat Trailers, 1976.
Shoreline, Inc. advertising catalog for boat trailer products.
Tee-Nee Trailer Co., advertising catalog for boat trailer products, 1981.

Primary Examiner—John A. Pekar
Assistant Examiner—D. Lynn Fugate
Attorney, Agent, or Firm—David A. Burge

[57] ABSTRACT

A boat trailer for loading, transporting and launching a boat includes a wheel-supported frame having a pair of longitudinally-extending frame rails. A transversely-extending aft support cradle is connected to the frame rails and is arranged to pivot relative to the rails in forward and rearward directions to facilitate loading and launching of a boat. The cradle is of a U-shaped configuration, having a pair of support arms which extend upwardly at opposite ends of a cross-beam. The support arms overlie side portions of the frame rails and are pivotally connected to the frame rails near upper surfaces thereof. The cradle carries at least one longitudinally extending rocker arm which supports hull engagement rollers. The pivotal connections between the support arms and the frame rails are located relatively high with respect to the locations of the hull engagement rollers. During boat launching, the cradle swings forwardly, causing the rollers to move forwardly in unison relative to the trailer frame to help "uncradle" the boat. During boat recovery, the cradle swings rearwardly, causing the rollers to move rearwardly in unison relative to the trailer frame to better "cradle" the boat.

7 Claims, 3 Drawing Figures

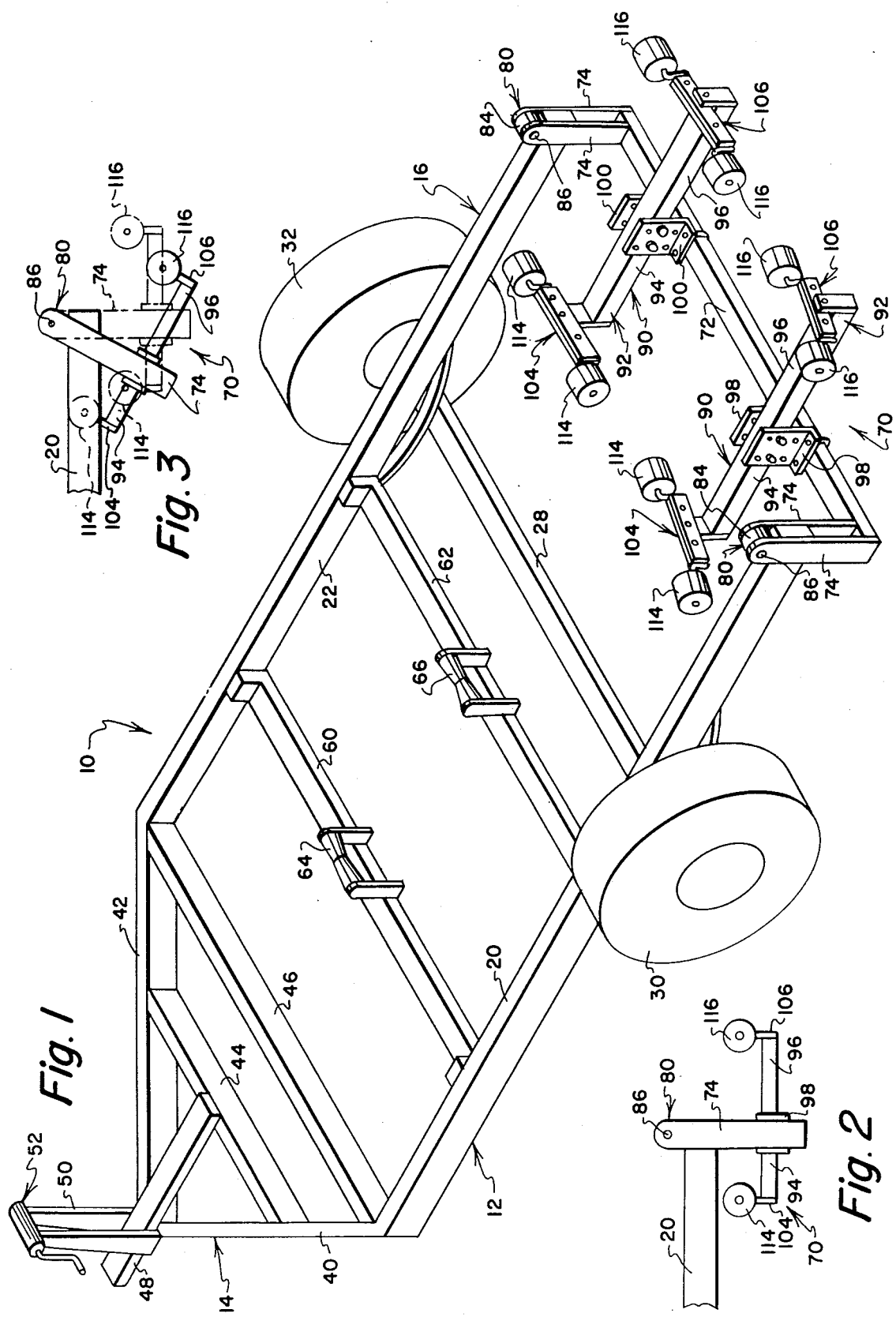

4,448,438

BOAT TRAILER WITH IMPROVED AFT SUPPORT CRADLE

BACKGROUND OF THE INVENTION

1. Field of the Invention

The present invention relates to a trailer for transporting, launching and recovering a boat, and, more particularly, to a trailer having an aft support cradle which pivots relative to an elongate trailer frame in a particularly advantageous manner to assist in launching and recovery operations.

2. Prior Art

The merit and usefulness of a boat trailer is measured, in large part, by the degree of efficiency it helps attain during the lauching and recovery of a boat from a body of water. The behavior of the trailer as a boat passes over the aft of the trailer during launching and recovery is crucial.

A variety of aft end constructions have been proposed for boat trailers in efforts to enhance launching and loading performance. A problem which has not been satisfactorily addressed by many proposals is the need for an aft support cradle which will accommodate boat hulls of a wide variety of sizes and configurations. Still another problem not adequately addressed by many aft support cradle proposals is the need to provide a cradle which executes such types of movement during launching and recovery as will assist in carrying out the launching and recovery operations.

SUMMARY OF THE INVENTION

The present invention overcomes the foregoing and other drawbacks of prior proposals by providing a boat trailer having an improved aft support cradle. Trailers incorporating the improved cradle are simple in design, economical to manufacture, and compatible with boat hulls of a wide variety of shapes and sizes. Moreover the cradle of the present invention executes a particularly advantageous type of movement as a boat passes over the aft of its supporting trailer. The types of cradle movements which are achieved with the present invention facilitate the launching and loading of a boat.

In accordance with the preferred practice of the present invention, a boat trailer has an elongate frame including a pair of spaced, longitudinally-extending frame rails. An aft support cradle is pivotally connected to the frame rails. The cradle is of generally U-shaped configuration including a transversely-extending cross-beam with upwardly-extending support arms connected to the cross-beam near its ends. The support arms are pivotally connected to the frame rails at locations near the upper surfaces of the frame rails. The cradle has at least one longitudinally-extending rocker arm fastened to the cross-beam. Forward and rearward hull engagement rollers are carried on the rocker arm at locations which are respectively forward and rearward relative to the cross-beam.

A feature of the cradle lies in the relative locations of the (1) pivots between the support arms of the cradle and the frame rails, and (2) the hull engagement rollers. The cradle pivots are located relatively high with respect to the locations of the rollers, whereby two particularly advantageous types cradle movement result, namely:

(1) When a boat is being loaded onto the trailer over the trailer's aft end, the cradle swings rearwardly relative to the trailer frame such that the hull engagement rollers carried by the cradle all move in unison relatively rearwardly with respect to the trailer frame to better underlie and "cradle" the boat; and, (2) When a boat is being launched over the aft end of a trailer, the cradle swings forwardly relative to the trailer frame such that the hull engagement rollers carried by the cradle all move in unison relatively forwardly with respect to the trailer frame to better "uncradle" the boat.

A fuller understanding of these and other features of the invention will be had by referring to the following description and claims taken in conjunction with the accompanying drawing.

BRIEF DESCRIPTION OF THE DRAWING

FIG. 1 is a perspective view of a boat trailer embodying the preferred practice of the present invention;

FIG. 2 is a schematic view illustrating the aft support cradle of the trailer in its loaded position; and, FIG. 3 is a schematic view illustrating the aft support cradle pivoted to its launched position, with the loaded position of the cradle rollers being shown in phantom.

DESCRIPTION OF THE PREFERRED EMBODIMENT

Referring to FIG. 1, a boat trailer 10 has a frame 12 which has fore and aft end portions 14, 16. The frame 12 has a pair of spaced, longitudinally-extending frame rails 20, 22. A transversely-extending axle structure 28 supports the frame rails 20, 22 on wheels 30, 32.

The fore end portion 14 includes A-frame support members 40, 42, and tranverse support members 44, 46. Ends of the members 40, 46 are welded to the frame rail 20. Ends of the members 42, 46 are welded to the frame rail 22. A hitch bar 48 is secured to the support members 40, 42, 44. A conventional coupling device (not shown) is preferably carried on the hitch bar 48 for coupling the trailer 10 to a towing vehicle (not shown). A mast 50 is provided atop the hitch bar 48 for supporting a winch 52 to assist in loading and launching a boat (not shown) onto and from the trailer 10.

Central portions of the frame rails 20, 22 are interconnected by a pair of transverse-extending members 60, 62. Keel support rollers 64, 66 are carried on the members 60, 62 for engaging and supporting the keel of a boat hull.

The aft end portion 16 of the trailer 10 is provided with an aft support cradle, indicated generally by the numeral 70. The cradle 70 is of generally U-shaped configuration including a transversely-extending cross-bar 72 with upwardly extending support arms 74 at its ends. The cross-bar 72 and the support arms 74 are preferably welded together to provide a rigid structure. Pivotal connections are provided between the support arms 74 and the frame rails 20, 22, at locations indicated generally by arrows 80. The pivotal connections 80 are formed by welding a pair of bushings 84 to the upper surfaces of the frame rails 20, 22, and by providing pins 86 which extend through aligned holes formed in the bushings 84 and in the upper end regions of the support arms 74.

A pair of rocker arm assemblies 90 are carried at spaced locations along the transversely-extending cross-bar 72. The assemblies 90 include longitudinally-extending rocker arms 92 having forward and rearward portions 94, 96 which extend, respectively, forwardly and rearwardly relative to the cross-bar 72. Brackets 98, 100 secure the rocker arms 92 in selected positions along the length of the cross-bar 72. The forwardly-extending arm portions 94 are shorter than the rearwardly-extending arm portions 96, as is best seen in FIG. 2. Forward and rearward brackets 104, 106 are provided respectively at the forward and rearward ends of the arm portions 94, 96. Forward and rearward hull engagement rollers 114, 116 are carried, respectively, on the brackets 104, 106.

FIGS. 2 and 3 provide schematic representations of the relative locations of the pivotal connections 80 and the hull engagement rollers 114, 116. The forward rollers 114 are located forwardly with respect to the pivotal connections 80. The rearward rollers 116 are located rearwardly with respect to the pivotal connections 80. The pivotal connections 80 are located "relatively high" with respect to the rollers 114, 116, by which is meant that, when the rollers 114, 116 are positioned in substantially the same horizontal plane, as is shown in FIG. 2, the pivotal connections 80 are located above the axes of the rollers 114, 116. In preferred practice, the pivotal connections 80 are positioned sufficiently high relative to the locations of the rollers 114, 116 such that during a majority, if not all, of the pivotal movement of the cradle 70, the pivotal connections 80 continue to be located relatively above the axes of the rollers 114, 116. In the embodiment depicted in the drawings, the pivots 80 are located sufficiently high relative to the rollers that they remain above the locations of even the forward rollers 114 throughout the range of pivotal movement of the cradle 70.

By locating the pivotal connections 80 relatively high with respect to the locations of the rollers 114, 116, the cradle 20 is caused to execute desirable types of movements as a boat passes over the aft end of the trailer 10. As the cradle 70 swings forwardly from its loaded position (shown in FIG. 2) to its launched position (shown in FIG. 3) during launching of a boat, the rollers 114, 116 move in unison in forward directions to "uncradle" the boat being launched. Similarly, when the cradle 70 swings rearwardly from its launched position (shown in FIG. 3) to its loaded position (shown in FIG. 2) during loading of a boat, the rollers 114, 116 move in unison in rearward directions to better underlie and "cradle" the boat being loaded.

The advantageous type of "cradling" and "uncradling" movement described above is further enhanced by locating the forward hull engagement rollers 114 closer to the cross-beam 72 than are the rearward hull engagement rollers 116. By this arrangement, the forward rollers 114 travel through shorter vertical distances than do the rearward rollers 116 each time the cradle 70 pivots. Thus as a boat is loaded or launched, aft portions of the cradle 70 are caused to raise or lower to greater degrees than fore portions, and the type of "cradling" and "uncradling" actions which are provided by positioning of the pivots 80 relatively high with respect to the locations of the rollers 114, 116 are thereby further enhanced.

Although the invention has been described in its preferred form with a certain degree of particularity, it is understood that the present disclosure of the preferred form is only by way of example and that numerous changes in the details of construction and the combination and arrangement of parts may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A boat trailer for towing a boat and for loading and launching the boat from and onto a body of water, comprising:
    (a) a wheel supported trailer frame including longitudinally-extending frame rails and at least one transversely-extending member interconnecting the frame rails;
    (b) hull support means carried on the frame for engaging portions of the hull of a boat which has been loaded onto the trailer;
    (c) aft support cradle means including a cross-bar having upwardly extending support arms near opposite ends thereof, the support arms being pivotally connected to aft end portions of the frame rails at pivotal connection locations disposed near the upper surfaces of the frame rails;
    (d) the cradle means additionally including longitudinally-extending rocker arms means fastened to the cross-bar and including a forwardly-extending portion for carrying at least one forward hull engagement roller, a rearwardly-extending portion for carrying at least one rearward hull engagement roller, a forward hull engagement roller carried on the forwardly-extending portion, and a rearward hull engagement roller carried on the rearwardly-extending portion; and,
    (e) the cradle means and its rocker arm means being configured such that the locations of the pivotal connections between the support arms and the frame rails are above the locations at which the forward and rearward hull engagement rollers are carried on the rocker arm means when the cradle means is in a loaded position wherein the forward and rearward hull engagement rollers are substantially level with each other, for assuring that during launching of a boat from the trailer, as the cradle means begins to pivot from its loaded position toward a launched position wherein the forward hull engagement roller is relatively higher than the rearward hull engagement roller, the forward and rearward hull engagement rollers are caused to move in unison in a forward direction, and for assuring that during loading of a boat trailer, as the cradle begins to pivot from said launched position toward said loaded position, the forward and rearward hull engagment rollers are caused to move in unison in a rearward direction.

2. The boat trailer of claim 1 wherein the pivotal connections between the support arms and the frame rails are provided by:
    (a) at least two mounting members, each being connected to a separate one of the frame rails near the aft ends thereof;
    (b) the support arms including pairs of arm structures, each of which pairs includes first and second arm structures arranged to overlie opposed ends of a separate one of the mounting structures;
    (c) aligned holes being formed through the mounting members and through the first and second arm structures of each pair, the holes extending in a transverse direction; and,
    (d) pin means being positioned in the aligned holes for establishing said pivotal connections between the support arms and aft end portions of the frame rails.

3. The boat trailer of claim 2 wherein the mounting members are connected to top surfaces of the frame rails, and the first and second arm structures of each pair depend along opposed sides of their associated frame rails.

4. The boat trailer of claim 1 wherein the forwardly-extending portion of the rocker arm means is shorter than the rearwardly-extending portion, whereby the forward hull engagement roller is positioned more closely to the cross-bar than is the rearward hull engagement roller.

5. A boat trailer for loading, transporting and launching a boat, comprising:
   (a) a wheel-supported frame having a pair of spaced, longitudinally-extending frame rails, and a transversely-extending structure interconnecting the frame rails to form a rigid frame;
   (b) hull support means carried on the frame for engaging portions of the hull of a boat which has been loaded onto the trailer;
   (c) aft support cradle means including:
      (i) a transversely-extending cross-bar with opposed end portions each underlying a separate one of the frame rails;
      (ii) elongate support arms having their end regions connected rigidly to the end portions of the cross-bar and having upper end regions extending above upper surfaces of the frame rails;
      (iii) a pair of rocker arm means fastened to the cross-bar, each of the rocker having a forwardly-extending portion which extends forwardly relative to the cross-bar, and a rearwardly-extending portion which extends rearwardly relative to the cross-bar;
      (iv) forward hull engagement rollers, and rearward hull engagement rollers carried, respectively on the forwardly-extending and rearwardly-extending portions of the rocker arm means;
   (d) connection means for pivotally connecting the cradle means to the frame rails, including:
      (i) two mounting members, each being connected to the top surface of a separate one of the frame rails at a location adjacent a separate one of the upper end regions of the support arms;
      (ii) aligned holes formed through the mounting members and through the upper end regions of the support arms, the holes extending along a common transverse axis; and,
      (iii) pin means extending through the aligned holes for establishing pivotal connections between the support arms of the cradle means and the mounting members;
   (e) the cradle means and the connection means being configured such that the locations of the pivotal connections between the support arms and the frame rails are above the locations at which the forward and rearward hull engagement rollers are carried on the rocker arm means when the cradle means is in a loaded position wherein the forward and rearward hull engagement rollers are substantially level with each other, for assuring that during launching of a boat from the trailer, as the cradle means begins to pivot from its loaded position toward a launched position wherein the forward hull engagement rollers are relatively higher than the rearward hull engagement rollers, the forward and rearward hull engagement rollers are caused to move in unison in a forward direction, and for assuring that during loading of a boat onto the trailer, as the cradle begins to pivot from said launched position toward said loaded position, the forward and rearward hull engagement rollers are caused to move in unison in a rearward direction.

6. The boat trailer of claim 5 wherein:
   (a) the support arms are four in number and are arranged in pairs, with the arms of each pair extending along opposite sides of an associated frame rail and along opposite sides of an associated mounting member;
   (b) the aligned holes extend through all four of the support arms; and,
   (c) the pin means includes a pair of pins, with each pin extending through a separate one of the mounting members and through its associated pair of support arms.

7. The boat trailer of claim 6 wherein the forwardly-extending portion of the rocker arm means is shorter than the rearwardly-extending portion, whereby the forward hull engagement roller is positioned more closely to the cross-bar than is the rearward hull engagement roller.

* * * * *